US012800823B2

(12) United States Patent
Yoon et al.

(10) Patent No.: US 12,800,823 B2
(45) Date of Patent: Nov. 17, 2026

(54) LIGHT GUIDE PLATE, ILLUMINATION DEVICE INCLUDING THE SAME, AND METHOD OF MANUFACTURING THE LIGHT GUIDE PLATE

(71) Applicant: CORNING INCORPORATED, Corning, NY (US)

(72) Inventors: Gun-sang Yoon, Gyeonggi-do (KR); Hong Yoon, Asan-si (KR)

(73) Assignee: CORNING INCORPORATED, Corning, NY (US)

( * ) Notice: Subject to any disclaimer, the term of this patent is extended or adjusted under 35 U.S.C. 154(b) by 238 days.

(21) Appl. No.: 18/712,880

(22) PCT Filed: Nov. 15, 2022

(86) PCT No.: PCT/US2022/049910
§ 371 (c)(1),
(2) Date: May 23, 2024

(87) PCT Pub. No.: WO2023/096774
PCT Pub. Date: Jun. 1, 2023

(65) Prior Publication Data
US 2025/0020855 A1 Jan. 16, 2025

(30) Foreign Application Priority Data
Nov. 25, 2021 (KR) ........................ 10-2021-0164709

(51) Int. Cl.
*F21V 8/00* (2006.01)

(52) U.S. Cl.
CPC ......... *G02B 6/0058* (2013.01); *G02B 6/0051* (2013.01)

(58) Field of Classification Search
CPC .. G02B 6/0058; G02B 6/0051; G02B 6/0061; G02B 6/0041; G02B 5/0242; G02B 1/02
See application file for complete search history.

(56) References Cited

U.S. PATENT DOCUMENTS 5,667,289 A 9/1997 Akahane et al.
7,553,058 B2 6/2009 Chang
(Continued)

FOREIGN PATENT DOCUMENTS

DE 102009010720 A1 * 9/2010 ........... G02B 6/0061
EP 2378191 A2 10/2011
(Continued)

OTHER PUBLICATIONS

International Search Report and Written Opinion of the International Searching Authority; PCT/US2022/049910; dated Mar. 2, 2023; 16 pages; European Patent Office.
(Continued)

*Primary Examiner* — Mary Ellen Bowman
(74) *Attorney, Agent, or Firm* — Yiqun Zhao

(57) ABSTRACT

Provided is an illumination device including a light extraction film having a light guide plate including one or more edges and including a transparent substrate and a light extraction film on the light guide plate, where the film includes a matrix layer, and a plurality of scattering particles embedded in the matrix layer, and the plate includes first areas in which a volume density of the particles of the light extraction film is substantially constant, and second areas in which a volume density of the particles of the light extraction film varies along a Gaussian profile.

41 Claims, 14 Drawing Sheets

(56) References Cited

U.S. PATENT DOCUMENTS

| | | | | |
|---|---|---|---|---|
| 8,033,706 | B1 | 10/2011 | Kelly et al. | |
| 8,746,949 | B2 | 6/2014 | Ono et al. | |
| 8,842,239 | B2 | 9/2014 | Chen et al. | |
| 9,039,905 | B2 | 5/2015 | Ouderkirk et al. | |
| 9,075,172 | B2 | 7/2015 | Koh et al. | |
| 9,268,082 | B2 | 2/2016 | Van Dijk et al. | |
| 9,588,277 | B2 | 3/2017 | Nakashima et al. | |
| 9,720,165 | B2 | 8/2017 | Park et al. | |
| 9,739,927 | B2 | 8/2017 | Komura et al. | |
| 9,784,889 | B2 | 10/2017 | Fujii et al. | |
| 9,803,819 | B2 | 10/2017 | Sciascia et al. | |
| 9,927,616 | B2 | 3/2018 | Hsu et al. | |
| 9,941,487 | B2 | 4/2018 | Wehlus | |
| 10,042,105 | B2 | 8/2018 | Ezell | |
| 10,267,972 | B2 | 4/2019 | Vasylyev | |
| 10,310,166 | B2 | 6/2019 | Uehara et al. | |
| 10,330,848 | B2 | 6/2019 | Wong | |
| 10,754,173 | B2 | 8/2020 | Liu et al. | |
| 10,830,941 | B2 | 11/2020 | Deflandre et al. | |
| 10,877,205 | B1 | 12/2020 | Parsons et al. | |
| 11,112,559 | B2 * | 9/2021 | Kim ..................... | G02B 6/0043 |
| 2004/0130883 | A1 | 7/2004 | Leu et al. | |
| 2004/0184257 | A1 * | 9/2004 | Huang ................. | G02B 6/0043 362/613 |
| 2010/0110675 | A1 | 5/2010 | Van et al. | |
| 2011/0242851 | A1 | 10/2011 | Landry et al. | |
| 2013/0114291 | A1 | 5/2013 | Brick et al. | |
| 2013/0336001 | A1 | 12/2013 | Boonekamp | |
| 2014/0063609 | A1 | 3/2014 | Iwata et al. | |
| 2014/0092627 | A1 | 4/2014 | Nakashima et al. | |
| 2014/0092632 | A1 | 4/2014 | Greener et al. | |
| 2015/0009648 | A1 | 1/2015 | Ouderkirck et al. | |
| 2015/0185408 | A1 | 7/2015 | Hsu et al. | |
| 2016/0091652 | A1 | 3/2016 | Sahlhoff | |
| 2016/0139324 | A1 | 5/2016 | Yagi et al. | |
| 2016/0299285 | A1 | 10/2016 | Lee et al. | |
| 2016/0313493 | A1 | 10/2016 | Lee et al. | |
| 2017/0045666 | A1 | 2/2017 | Vasylyev | |
| 2017/0269285 | A1 | 9/2017 | Hirayama et al. | |
| 2017/0336555 | A1 | 11/2017 | Yanai et al. | |
| 2018/0039013 | A1 | 2/2018 | Yanai et al. | |
| 2018/0224579 | A1 | 8/2018 | Ibuki et al. | |
| 2019/0079239 | A1 | 3/2019 | Vasylyev et al. | |
| 2019/0101685 | A1 | 4/2019 | Sasaki et al. | |
| 2019/0146139 | A1 | 5/2019 | Joo et al. | |
| 2019/0243052 | A1 | 8/2019 | Hamilton et al. | |
| 2019/0377123 | A1 | 12/2019 | Boerner et al. | |
| 2020/0033604 | A1 | 1/2020 | Schmulen et al. | |
| 2020/0103583 | A1 * | 4/2020 | Kim ..................... | G02B 6/0065 |
| 2020/0150333 | A1 | 5/2020 | Vasylyev et al. | |
| 2020/0257035 | A1 | 8/2020 | Kuksenkov et al. | |
| 2021/0026086 | A1 | 1/2021 | Rinko et al. | |
| 2023/0127424 | A1 * | 4/2023 | Kim ..................... | G02B 6/0061 362/611 |

FOREIGN PATENT DOCUMENTS

| | | | |
|---|---|---|---|
| EP | 3083519 | A2 | 10/2016 |
| EP | 2135000 | B1 | 7/2018 |
| EP | 3770483 | A1 | 1/2021 |
| JP | 4251093 | B2 | 4/2009 |
| JP | 2009-140745 | A | 6/2009 |
| KR | 10-2005-0041081 | A | 5/2005 |
| KR | 10-2018-0046273 | A | 5/2018 |
| KR | 10-2063058 | B1 | 1/2020 |
| KR | 10-2021-0121973 | A | 10/2021 |
| WO | 2006/035354 | A1 | 4/2006 |
| WO | 2010/014570 | A1 | 2/2010 |
| WO | 2010/097207 | A1 | 9/2010 |
| WO | 2016/019220 | A1 | 2/2016 |
| WO | 2016/019290 | A2 | 2/2016 |
| WO | 2017/214475 | A1 | 12/2017 |
| WO | 2018/125624 | A1 | 7/2018 |
| WO | 2018/144720 | A1 | 8/2018 |
| WO | 2019/180676 | A1 | 9/2019 |
| WO | 2020/072336 | A1 | 4/2020 |
| WO | 2021/202461 | A1 | 10/2021 |

OTHER PUBLICATIONS

"The Lighting Handbook", ZUMTOBEL Lightings GmbH (2017), 244 pages.

Hyeon-Don Kim et al., "Fabrication of a uniform microlens array over a large area using self-aligned diffuser lithography (SADL)", J. Micromech. Microeng. 22, 045002 (2012), 8 Pages.

Lee et al., "Design and fabrication of a micropatterned polydimethylsiloxane (PDMS) light-guide plate for sheet-less LCD backlight unit", Journal of the SID 16/2 (2008), 7 pages.

Korean Patent Application No. 10-2021-0164709, Office Action dated Feb. 19, 2026, 8 pages (English Translation only), Korean Patent Office.

* cited by examiner

LIGHT GUIDE PLATE, ILLUMINATION DEVICE INCLUDING THE SAME, AND METHOD OF MANUFACTURING THE LIGHT GUIDE PLATE

This application claims the benefit of priority under 35 U.S.C. § 371 of International Application No. PCT/US2022/049910, filed on Nov. 15, 2022, which claims the benefit of priority under 35 U.S.C. § 119 of Korean Patent Application Serial No. 10-2021-0164709, filed on Nov. 25, 2021, the content of which is relied upon and incorporated herein by reference in its entirety.

BACKGROUND

1. Cross-Reference to Related Applications

This application claims the benefit of priority under 35 U.S.C. § 119 of Korean Patent Application Serial No. 10-2021-0164709, filed on Nov. 25, 2021, the content of which is relied upon and incorporated herein by reference in its entirety.

2. Field

The present disclosure relates to a light guide plate and an illumination device including the same.

3. Description of the Related Art

Generally, a light guide plate is made of a substrate having good transparency, such as acrylic or polycarbonate, and spreads light therein by using a total reflection event that occurs when light travels from a medium with a high refractive index to a medium with a low refractive index. Light moving inside a light guide plate by total reflection may be extracted to the outside of the light guide plate by a light extraction site inside the light guide plate.

Examples of a method of making such a light extraction site include a method of mechanically making a "V"-shaped groove, a method of printing a micro lens by inkjet, and a method of printing a dot pattern on a surface of a light guide plate by screen printing. However, when a dot pattern is printed on a surface of a light guide plate, a distance between dot patterns is too large compared to the size of the dot patterns, so a separate diffusion plate is required to realize uniform luminance.

Recently, as the inkjet technology is developed, dot patterns have been further refined. When the refined dot patterns are randomly arranged, the refined dot patterns may serve as a diffusion plate. However, in a case of an illumination device using such dot patterns, the dot patterns are recognized by the naked eye, thereby deteriorating the aesthetics of a product. In addition, when the size of the dot patterns is reduced, the number of dot patterns to be printed increases, which lowers the productivity.

SUMMARY

The present disclosure provides a light guide plate having improved optical characteristics and an illumination device including the same.

Additional aspects will be set forth in part in the description which follows and, in part, will be apparent from the description, or may be learned by practice of the presented embodiments of the disclosure.

According to example embodiments, provided is an illumination device including a light guide plate, wherein the light guide plate includes one or more edges and includes a transparent substrate and a light extraction film on the transparent substrate, and a plurality of light sources configured to irradiate light to the one or more edges of the light guide plate.

In some embodiments, the light extraction film includes a matrix layer and a plurality of scattering particles embedded in the matrix layer, and the light guide plate includes first areas in which a volume density of the plurality of scattering particles of the light extraction film is substantially constant, and second areas in which the volume density of the plurality of scattering particles of the light extraction film varies along a Gaussian profile.

In some embodiments, the first areas are adjacent to corners of the light guide plate.

In some embodiments, the each of first areas include corresponding one of corners of the light guide plate.

In some embodiments, a sum of areas of the first areas ranges from 10% to 40% of an area of the light guide plate.

In some embodiments, a sum of areas of the first areas range from 15% to 35% of an area of the light guide plate.

In some embodiments, a sum of areas of the first areas ranges from 20% to 30% of an area of the light guide plate.

In some embodiments, a sum of areas of the first areas is 25% of an area of the light guide plate.

In some embodiments, a planar shape of the light guide plate is a square shape.

In some embodiments, a planar shape of each of the first areas is a square shape.

In some embodiments, a planar shape of the light guide plate is a square shape, and each of the first areas is a portion of a circle around a corresponding one of corners of the light guide plate.

In some embodiments, each of the second areas is between two neighboring first areas among the first areas.

In some embodiments, the light guide plate further includes a third area surrounded by the first areas and the second areas.

In some embodiments, the volume density of the plurality of scattering particles of the light extraction film in the third area varies along a Gaussian profile.

In some embodiments, the volume density of the plurality of scattering particles of the light extraction film in the second areas and the third area varies along a Gaussian profile with a distance from a center of the light guide plate as a variable.

In some embodiments, an average of the volume density of the plurality of scattering particles of the light extraction film in each of the first areas is less than an average of the volume density of the plurality of scattering particles of the light extraction film in each of the second areas.

In some embodiments, an average of the volume density of the plurality of scattering particles of the light extraction film in each of the first areas is less than an average of the volume density of the plurality of scattering particles of the light extraction film in the third area.

In some embodiments, an average of the volume density of the plurality of scattering particles of the light extraction film in each of the second areas is less than an average of the volume density of the plurality of scattering particles of the light extraction film in the third area.

In some embodiments, twice an average of the volume density of the plurality of scattering particles of the light extraction film in each of the first areas is greater than an average of the volume density of the plurality of scattering particles of the light extraction film in the third area.

In some embodiments, twice an average of the volume density of the plurality of scattering particles of the light extraction film in each of the second areas is greater than an average of the volume density of the plurality of scattering particles of the light extraction film in the third area.

In some embodiments, the volume density of the plurality of scattering particles of the light extraction film in each of the first areas is less than a minimum value of the volume density of the plurality of scattering particles of the light extraction film in each of the second areas.

In some embodiments, the volume density of the plurality of scattering particles of the light extraction film in each of the first areas is less than a minimum value of the volume density of the plurality of scattering particles of the light extraction film in the third area.

In some embodiments, a difference between the volume density of the plurality of scattering particles of the light extraction film in each of the first areas and a minimum value of the volume density of the plurality of scattering particles of the light extraction film in each of the second areas ranges from 0.01 vol % p to 0.2 vol % p.

According to example embodiments, provided is a light guide plate including a transparent substrate having a rectangular planar shape, and a light extraction film on the transparent substrate.

In some embodiments, the light extraction film includes a matrix layer and a plurality of scattering particles embedded in the matrix layer, a volume density of the plurality of scattering particles of the light extraction film on a first axis varies along a Gaussian profile, wherein the first axis passes through a center of the light guide plate and is parallel to any one of edges of the light guide plate, and the volume density of the plurality of scattering particles of the light extraction film on a second axis varies along a trimmed Gaussian profile having a planarized tail portion, wherein the second axis passes through the center of the light guide plate and connects two corners of the light guide plate diagonally positioned to each other.

In some embodiments, the volume density of the plurality of scattering particles of the light extraction film on a third axis varies along a Gaussian profile, wherein the third axis passes through the center of the light guide plate and is perpendicular to the first axis.

In some embodiments, a minimum value of the volume density of the plurality of scattering particles of the light extraction film on the first axis is greater than the volume density of the plurality of scattering particles of the light extraction film of the planarized tail portion on the second axis.

In some embodiments, the volume density of the plurality of scattering particles of the light extraction film is maximum at the center of the light guide plate.

In some embodiments, the volume density of the plurality of scattering particles of the light extraction film in the second areas and the third area is a Gaussian profile with a distance from the center of the light guide plate as a variable.

In some embodiments, a size of each of the plurality of scattering particles ranges from 100 nm to 1000 nm.

In some embodiments, a haze of the light guide plate ranges from 0.1% to 5%.

In some embodiments, a transmittance of the light guide plate ranges from 86% to 89%.

In some embodiments, a length of each of four edges of the light guide plate is 100 mm or more.

In some embodiments, a refractive index of the matrix layer is greater than a refractive index of the transparent substrate.

In some embodiments, each of the plurality of scattering particles includes any one of $TiO_2$, $ZrO_2$, $BaTiO_3$, and $SnO_2$.

According to example embodiments, provided is an illumination device including a light guide plate, wherein the light guide plate includes a transparent substrate having a polygonal planar shape and a light extraction film on the transparent substrate, and a plurality of light sources configured to irradiate light to each of edges of the light guide plate.

In some embodiments, the volume density of the plurality of scattering particles of the light extraction film in each of the first areas is less than a minimum value of the volume density of the plurality of scattering particles of the light extraction film in each of the second areas.

In some embodiments, a difference between the volume density of the plurality of scattering particles of the light extraction film in each of the first areas and a minimum value of the volume density of the plurality of scattering particles of the light extraction film in each of the second areas ranges from 0.01 vol % p to 0.2 vol % p.

In some embodiments, a difference between the volume density of the plurality of scattering particles of the light extraction film in each of the first areas and a minimum value of the volume density of the plurality of scattering particles of the light extraction film in each of the second areas is 0.05 vol % p or more.

In some embodiments, a difference between the volume density of the plurality of scattering particles of the light extraction film in each of the first areas and a minimum value of the volume density of the plurality of scattering particles of the light extraction film in each of the second areas is 0.15 vol % p or less.

In some embodiments, the light guide plate further includes a third area surrounded by the first areas and the second areas.

In some embodiments, the volume density of the plurality of scattering particles of the light extraction film in the second areas and the third area varies along a Gaussian profile with a distance from a center of the light guide plate as a variable.

According to example embodiments, provided is a method of manufacturing a light guide plate. The method includes preparing a printing solution including a resin and a plurality of scattering particles, providing droplets of the printing solution to form a light extraction film on a transparent substrate, and curing the light extraction film, wherein the light extraction film includes a first portion in which a volume density of the plurality of scattering particles is substantially constant, and a second portion in which the volume density of the plurality of scattering particles varies along a Gaussian profile.

In some embodiments, the providing of the droplets includes adjusting a volume density of the plurality of scattering particles of the light extraction film of the first portion and the second portion by adjusting a number of droplets provided per unit area.

In some embodiments, the providing of the droplets includes adjusting a volume density of the plurality of scattering particles of the light extraction film of the first portion and the second portion by adjusting a content of the plurality of scattering particles included in the droplets.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
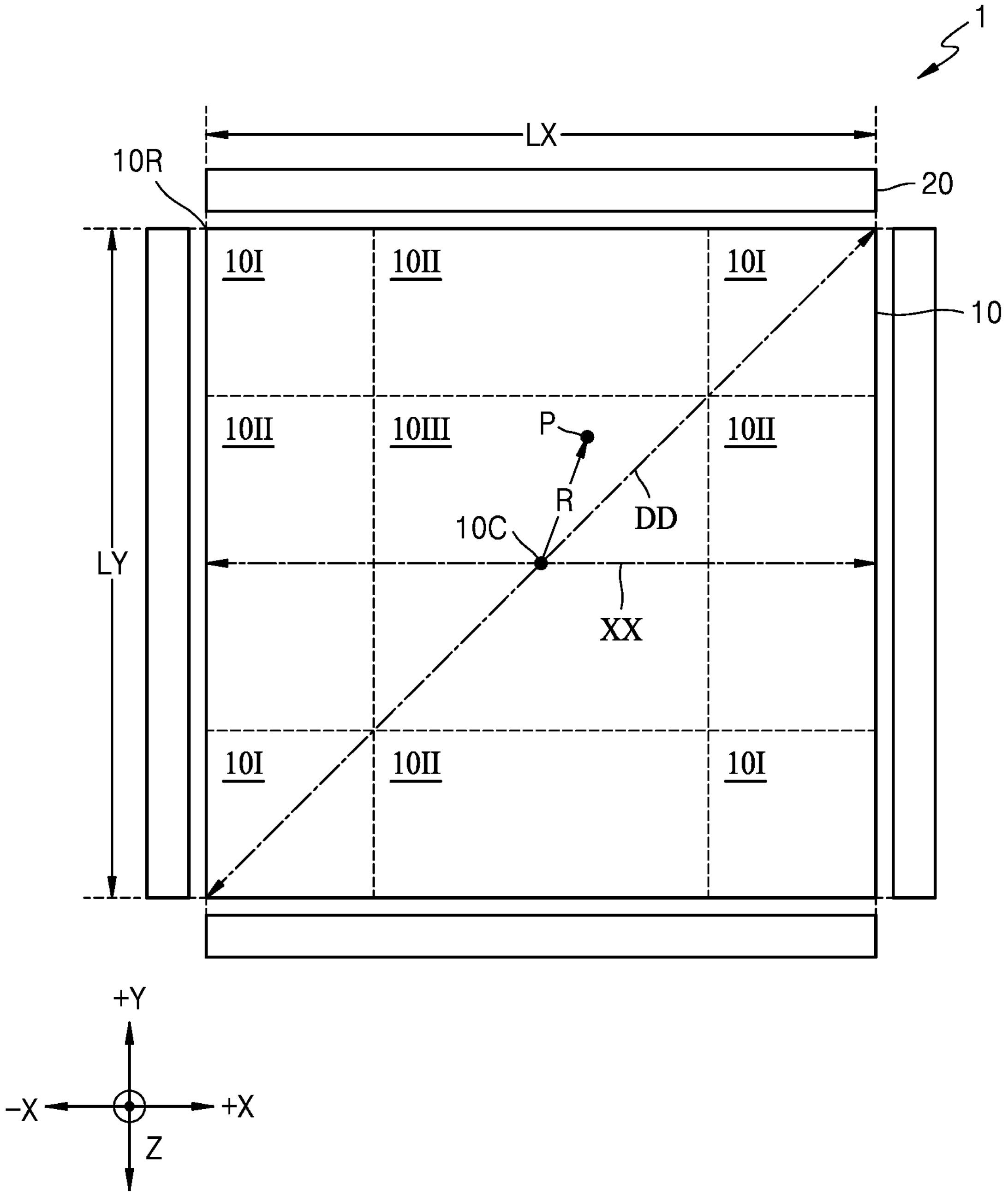
FIG. 1A is a plan view of an illumination device according to example embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The present disclosure will now be described more fully with reference to the accompanying drawings, in which exemplary embodiments of the present disclosure are shown. The present disclosure may, however, be embodied in many different forms and should not be construed as being limited to the exemplary embodiments set forth herein. Rather, these embodiments are provided so that this disclosure will be thorough and complete, and will fully convey the concept of the present disclosure to those skilled in the art. Like reference numerals in the drawings denote like elements, and thus their description will be omitted. Furthermore, various elements and regions in the drawings are schematically drawn. Accordingly, the present disclosure is not limited by the relative size or spacing drawn in the accompanying drawings.

While such terms as "first," "second," etc., may be used to describe various components, such components must not be limited to the above terms. The above terms are used only to distinguish one component from another. For example, without departing from the scope of the present disclosure, a first component may be referred to as a second component, and conversely, a second component may be referred to as a first component.

The terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless defined otherwise, all terms used herein include technical and scientific terms and have the same meaning as commonly understood by one of ordinary skill in the art to which the present disclosure belongs. In addition, commonly used terms as defined in the dictionary should be construed as having a meaning consistent with their meaning in the context of the relevant technology, and it will be understood that they should not be construed in an overly formal sense unless explicitly defined herein.

When a certain embodiment may be implemented differently, a specific process order may be performed differently from the described order. For example, two consecutively described processes may be performed substantially at the same time or performed in an order opposite to the described order.

FIG. 1A is a plan view of an illumination device 1 according to example embodiments.

Figure 1B:
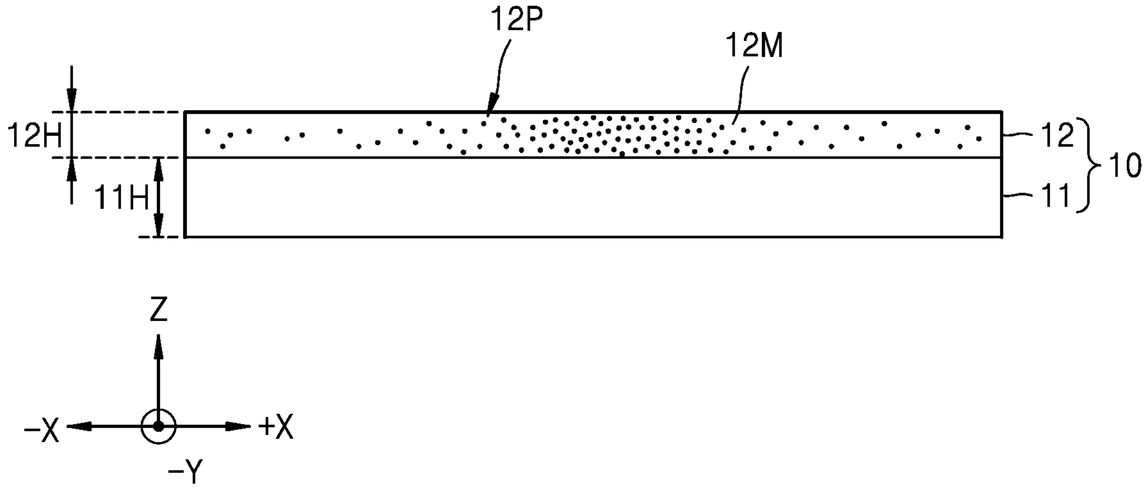
FIG. 1B is a cross-sectional view of a light guide plate taken along an axis XX of FIG. 1A.

FIG. 1B is a cross-sectional view of a light guide plate 10 taken along an axis XX of FIG. 1A.

Referring to FIGS. 1A and 1B, the illumination device 1 may include the light guide plate 10 and a plurality of light sources 20.

According to example embodiments, the light guide plate 10 may include a transparent substrate 11 and a light extraction film 12 on the transparent substrate 11.

The illumination device 1 may be, for example, a transparent illumination device. According to example embodiments, the light guide plate 10 may have high transmittance for light in a visible light band, and accordingly, when the illumination device 1 is turned off, a user may clearly recognize an object beyond the illumination device 1.

According to example embodiments, the illumination device 1 may have a Lambertian light distribution. The Lambertian light distribution means that a surface brightness of an object is isotropic. That is, the illumination device 1 may have the same apparent brightness regardless of a viewing angle.

The haze of the light guide plate 10 may be about 30% or less, and the transmittance of the light guide plate 10 may be about 50% or more. More desirably, the transmittance of the light guide plate 10 may range from about 86% to about 89%.

According to some embodiments, the haze of the light guide plate 10 may range from about 0.1% to about 5%. According to some embodiments, the haze of the light guide plate 10 may be about 0.5% or more. According to some embodiments, the haze of the light guide plate 10 may be about 1% or more. According to some embodiments, the haze of the light guide plate 10 may be about 1.5% or more. According to some embodiments, the haze of the light guide plate 10 may be about 4.5% or less.

According to some embodiments, the haze of the light guide plate 10 may be about 4% or less. According to some embodiments, the haze of the light guide plate 10 may be about 3.5% or less. According to some embodiments, the haze of the light guide plate 10 may be about 3% or less. According to some embodiments, the haze of the light guide plate 10 may be about 2.5% or less. According to some embodiments, the haze of the light guide plate 10 may be about 2% or less.

The haze of the light guide plate 10 is a ratio of the amount of light scattered by the light guide plate 10 to the amount of light incident on the light guide plate 10 when the light passes through the light guide plate 10. The transmittance of the light guide plate 10 is a ratio of the amount of light output through the light guide plate 10 to the amount of light incident on the light guide plate 10 when the light passes through the light guide plate 10.

The haze and the transmittance of the light guide plate 10 may be measured under standard temperature and pressure (STP) conditions. The haze and the transmittance of the light guide plate 10 may be measured by any suitable haze meter or haze measurement system. An example of a haze meter capable of measuring haze and transmittance of the light guide plate 10 is Hazegard manufactured by BYK Gardner. Hazegard is capable of simultaneous measurement of the haze and transmission according to ASTM D1003-illuminants C and A (a non-compensated method) or according to ISO 13468-illuminant D65 (a compensation method).

Herein, directions parallel to an upper surface of the transparent substrate 11 included in the light guide plate 10 are defined as a ±X direction and a ±Y direction. A +X direction and a −X direction may be opposite to each other, and a +Y direction and a −Y direction may be opposite to each other. The ±X direction may be substantially parallel to a pair of edges of the transparent substrate 11, and the Y direction may be substantially parallel to the other pair of edges of the transparent substrate 11.

The light guide plate 10 may have a relatively large area. A length LX in the ±X direction and a length LY in the ±Y direction may each ranges from about 100 mm to about 2,000 mme. The light guide plate 10 may include first areas 10I, second areas 10II, and a third area 10III. According to example embodiments, the first areas 10I may have different distribution characteristics of scattering particles 12P from those of the second areas 10II and the third area 10III. In FIG. 1A, broken lines on the light guide plate 10 are virtual auxiliary lines for dividing the first areas 10I, the second areas 10II, and the third area 10III defined on the light guide plate 10.

The first areas 10I may respectively be adjacent to corners 10R of the light guide plate 10. Each of the first areas 10I may include a corresponding one of the corners 10R of the light guide plate 10. According to example embodiments, the first areas 10I may be areas in which a distance in the ±X direction and a distance in the ±Y direction from the corners 10R of the light guide plate 10 are equal to or less than set values. According to example embodiments, the first areas 10I may approximately be square areas. According to example embodiments, the distance in the ±X direction and the distance in the ±Y direction of the first areas 10I may be substantially equal to each other. In another example, the first areas 10I may also be a portion of a circle around the corners 10R of the light guide plate 10, similar to the embodiments of FIGS. 6A and 7A.

The second areas 10II may be between adjacent first areas 10I. Each of the second areas 10II may be arranged adjacent to an edge of the light guide plate 10. Each of the second areas 10II may include a corresponding one of edges of the light guide plate 10. The third area 10III may be surrounded by the second areas 10II and the first areas 10I.

According to example embodiments, a sum of areas of the first areas 10I may range from about 10% to about 40% of an area of the light guide plate 10. According to example embodiments, the sum of areas of the first areas 10I may range from about 15% to about 35% of the area of the light guide plate 10. According to example embodiments, the sum of areas of the first areas 10I may range from about 20% to about 30% of the area of the light guide plate 10. According to example embodiments, the sum of areas of the first areas 10I may be about 25% of the area of the light guide plate 10.

Calculating the sum of the areas of the first areas may include identifying each of the first areas 10I, measuring an area of each of the identified first areas 10I, and summing the areas of each of the first areas 10I.

Identifying the first areas 10I may be performed by measuring the haze of light guide plate 10 or by measuring the density of the scattering particles 12P of the first areas 10I. The area in which the haze varies may be determined as the second area 10II and the third area 10III, and the area in which the haze is substantially constant may be determined as the first area 10I. A portion of the light guide plate 10 having a spatially varying haze may be determined as the second area 10II and the third area 10III, and a portion of the light guide plate 10 having a spatially constant haze may be determined as the first areas 10I. The haze of the light guide plate 10 may be measured by a commercial haze meter as described above.

In addition, in FIG. 1A, the axis XX is an axis parallel to the ±X direction and passing through a center 10C of the light guide plate 10, and an axis DD is an axis connecting diagonal corners 10R of the light guide plate 10 and passing through the center 10C of the light guide plate 10.

The transparent substrate 11 may include a material that is transparent to a visible light band. According to example embodiments, the transparent substrate 11 may include acrylic, glass, or the like. A refractive index of the transparent substrate 11 may range from about 1 to about 2. The refractive index of the transparent substrate 11 may be about 1.5.

The refractive index of the transparent substrate 11 may be measured, for example, by using ellipsometry. As another example, the refractive index of the transparent substrate 11 may be determined by a composition analysis and a crystal analysis of the transparent substrate 11. The manufacturer and product name of the transparent substrate 11 may be identified based on the composition analysis and crystal analysis of the transparent substrate 11, and the refractive index of the transparent substrate 11 may be determined based on a catalogue or the specification of the product.

The light extraction film 12 may include a matrix layer 12M and a plurality of scattering particles 12P embedded in the matrix layer 12M.

A thickness 12H of the matrix layer 12M may range from about 1 μm to about 10 μm. According to example embodiments, the thickness 12H of the matrix layer 12M may be about 2 μm or more. According to example embodiments, the thickness 12H of the matrix layer 12M may be about 2.6 μm or more. According to example embodiments, the thickness 12H of the matrix layer 12M may be about 3 μm or less. According to example embodiments, the thickness 12H of the matrix layer 12M may be about ½ of a thickness 11H of the transparent substrate 11, but is not limited thereto.

According to example embodiments, the matrix layer 12M may include a resin material. According to example embodiments, the matrix layer 12M may include a transparent material. According to example embodiments, the refractive index of the matrix layer 12M may be greater than that of the transparent substrate 11. According to example embodiments, the refractive index of the matrix layer 12M may range from about 1.5 to about 1.7.

According to example embodiments, upper and lower surfaces of the light extraction film 12 may be substantially planar surfaces. According to example embodiments, a surface roughness Ra of the light extraction film 12 may be 100 nm or less. Accordingly, the unevenness on a surface of the light extraction film 12 may be prevented from being recognized by a user's naked eye.

According to example embodiments, an areal density of the plurality of scattering particles 12P in the matrix layer 12M may range from about 0.1 [EA/$\mu m^2$] to about 0.4 [EA/$\mu m^2$]. For example, about 1000 to about 4000 scattering particles 12P may be distributed in the matrix layer 12M of about 10000 $\mu m^2$.

Each of the plurality of scattering particles 12H may include a transparent material. The plurality of scattering particles 12P may have a higher refractive index than that of the matrix layer 12M. Each of the plurality of scattering particles 12P may include any one of $TiO_2$, $ZrO_2$, $BaTiO_3$, and $SnO_2$.

Light generated by the plurality of light sources 20 may be totally reflected inside the light guide plate 10. Light, which is totally reflected inside the light guide plate 10, may be extracted from the light guide plate 10 by being scattered by the plurality of scattering particles 12P.

An average size (e.g., an average diameter) of each of the plurality of scattering particles 12P may range from about 100 nm to about 500 nm. An maximum size (e.g., a maximum diameter) of the plurality of scattering particles 12P may be 1 ram or less. When the average size of the plurality of scattering particles 12P ranges from about 100 nm to about 500 nm and the maximum size of the plurality of scattering particles 12P is 1 μm or less, the plurality of scattering particles 12P are not identified by the naked eye. Accordingly, the light transmittance of the light guide plate 10 in a turned-off state is maintained high, and a locally non-uniform haze is not formed, thereby providing a high level of user experience to a user using the illumination device 1.

According to example embodiments, the distribution of the plurality of scattering particles 12P may depend on a position P on the light guide plate 10. According to example embodiments, a volume density of the plurality of scattering particles 12P of the light extraction film 12 may vary according to a position on the light guide plate 10. Herein, the volume density of the plurality of scattering particles 12P of the light extraction film 12 in a particular area is a ratio of a volume of the plurality of scattering particles 12P included in the particular area to a volume of the light extraction film 12 in the particular area. Accordingly, the volume density of the plurality of scattering particles 12P of the light extraction film 12 may be a dimensionless quantity, unlike the areal density described above.

According to example embodiments, an average volume density of the plurality of scattering particles 12P in the first areas 10I may be less than an average volume density of the plurality of scattering particles 12P in the second areas 10II. According to example embodiments, the average volume density of the plurality of scattering particles 12P in the second areas 10II may be less than an average volume density of the plurality of scattering particles 12P in the third area 10III.

According to example embodiments, twice the average volume density of the plurality of scattering particles 12P in the first areas 10I may be greater than the average volume density of the plurality of scattering particles 12P in the third area 10III. According to example embodiments, twice the average volume density of the plurality of scattering particles 12P in the second areas 10II may be greater than the average volume density of the plurality of scattering particles 12P in the third area 10III.

The illumination device 1 may include the plurality of light sources 20 in a number corresponding to a shape of the light guide plate 10. For example, when the light guide plate 10 substantially has a square shape as in the embodiment of FIG. 1, the illumination device 1 may include four light sources 20 respectively corresponding to four edges of the square.

Figure 2:
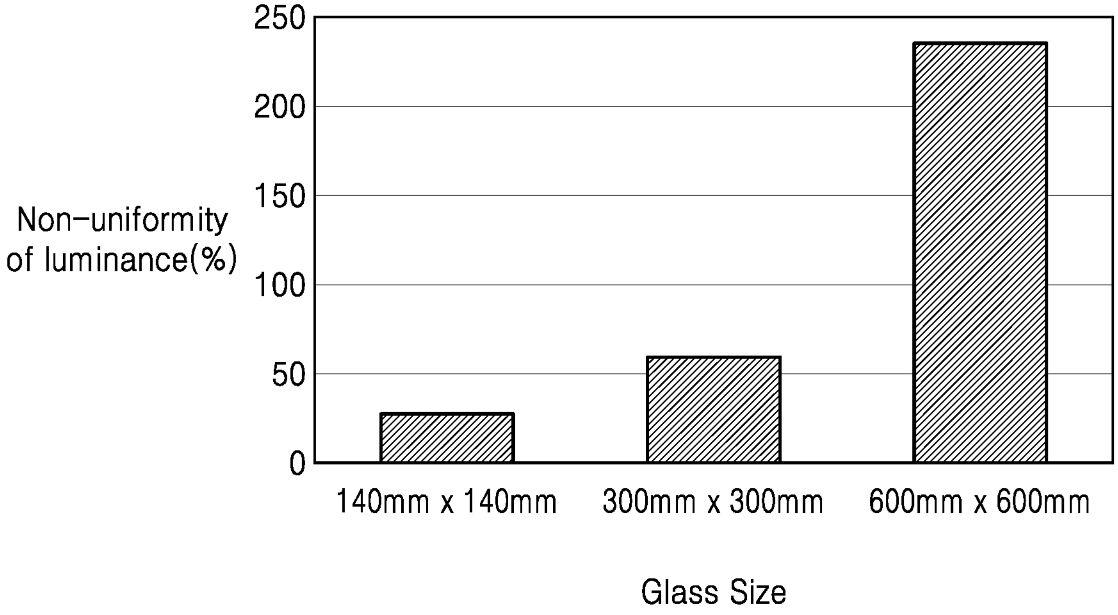
FIG. 2 is a graph for explaining an effect of an illumination device according to example embodiments.

FIG. 2 is a graph for explaining an effect of the illumination device 1 according to example embodiments. In more detail, FIG. 2 is a graph showing the non-uniformity of luminance for each of illumination devices of a comparative example in which light is irradiated by a light source to a pair of opposing edges among four edges of a light guide plate having a rectangular shape and light is not irradiated to another pair of edges.

Here, the non-uniformity of luminance is a value determined according to Equation 1 below.

$$\text{Non uniformity}(\%) = \frac{\Delta I}{Iavg} \qquad \text{[Equation 1]}$$

In Equation 1, Iavg is an average of a luminance across all illumination devices, and ΔI is a difference between a maximum luminance and an average luminance of illumination.

Referring to FIGS. 1A to 2, when an area of a light guide plate is 140 mm×140 mm, 300 mm×300 mm, and 600 mm×600 mm, it was confirmed that the non-uniformity of luminance was much greater than 10%, respectively. When the non-uniformity of luminance is greater than 10%, the non-uniformity of luminance is easily recognized by the user, thereby impairing the aesthetic characteristics of the illumination device and making the user's eyes tired. In a case of illumination of a relatively large area (e.g., 100 mm×100 mm or more), it was confirmed that the non-uniformity of luminance of the illumination device was excessively large when a light source was provided only at a pair of edges. According to example embodiments, the illumination device 1 includes the plurality of light sources 20 irradiating light to respective edges of the light guide plate 10, so that the non-uniformity of luminance of the illumination device 1 may be alleviated.

Hereinafter, the volume density of the plurality of scattering particles 12P of the light extraction film 12 will be described in more detail with reference to FIGS. 3A and 3B.

Figure 3A:
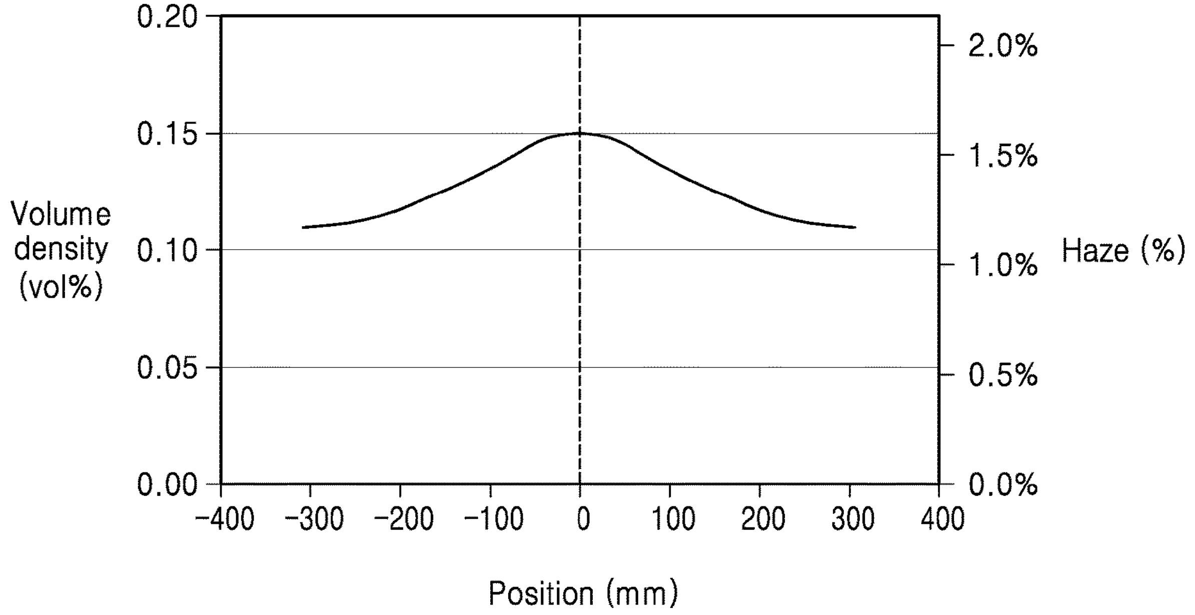
FIG. 3A shows the density of scattering particles of a light extraction film according to a distance from a center of the light guide plate on the axis XX of FIG. 1A.
Figure 3B:
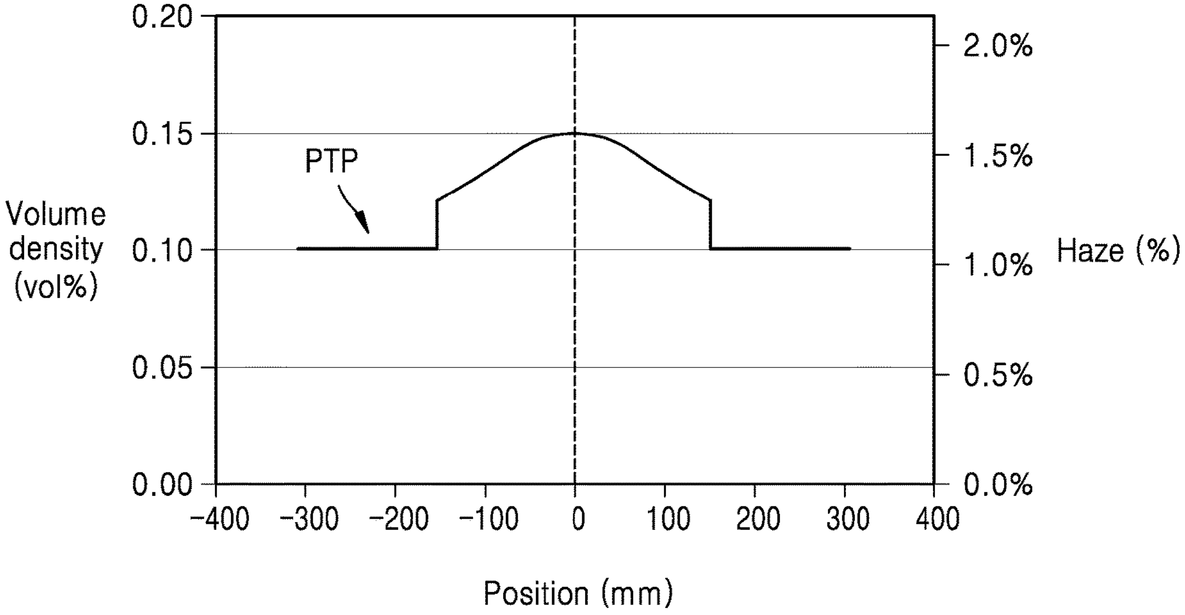
FIG. 3B shows the density of scattering particles of a light extraction film according a distance from to a center of the light guide plate on an axis DD of FIG. 1A.

FIG. 3A is shows an example of the density of the plurality of scattering particles 12P of the light extraction film 12 according to a distance R from the center 10C of the light guide plate 10 on the axis XX of FIG. 1A, and FIG. 3B shows an example of the density of the plurality of scattering particles 12P of the light extraction film 12 according to the distance R from the center 10C of the light guide plate 10 on the axis DD of FIG. 1A.

Referring to FIGS. 1A, 1B, 3A, and 3B, the volume density of the plurality of scattering particles 12P of the light extraction film 12 in the first areas 10I may be substantially constant. According to example embodiments, the volume densities of the plurality of scattering particles 12P of the light extraction film 12 in the second areas 10II and the third area 10III may vary depending on the distance R from the center 10C of the light guide plate 10 at a position P on the light guide plate 10.

According to example embodiments, the volume density of the plurality of scattering particles 12P of the light extraction film 12 may be maximum at the center 10C of the light guide plate 10. According to example embodiments, the volume densities of the plurality of scattering particles 12P of the light extraction film 12 in the second areas 10II and the third area 10III may have a Gaussian profile with the distance R from the center 10C as a variable.

When the volume densities of the scattering particles 12P of the second areas 10II and the third area 10III have a Gaussian profile or vary along a Gaussian profile, the volume densities of the scattering particles 12P of the second areas 10II and the third area 10III may be determined according to Equation 2 below.

$$\text{Volume density} = V_0 \exp\left(-\frac{(R)^2}{2\sigma^2}\right) \qquad \text{[Equation 2]}$$

Here, $V_0$ is the maximum value of the volume density, R is the distance from the center 10C of the light guide plate 10, and σ may be appropriately designed.

The axis XX extends on the second areas 10II and the third area 10III, and the volume density of the plurality of scattering particles 12P of the light extraction film 12 on the axis XX may include only the Gaussian profile as shown in FIG. 3A. That is, the volume density of the plurality of scattering particles 12P of the light extraction film 12 may vary along the Gaussian profile on the axis XX. The volume density of the plurality of scattering particles 12P of the light extraction film 12 according to an axis (that is, an axis parallel to the ±Y direction) passing through the center 10C of the light guide plate 10 and being perpendicular to the axis XX may vary along the Gaussian profile shown in FIG. 3A, which is substantially the same as the volume density of the plurality of scattering particles 12P of the light extraction film 12 on the axis XX.

The axis DD extends on the first areas 10I and the third area 10III, and the volume density of the plurality of scattering particles 12P of the light extraction film 12 on the axis DD may include a portion that varies in accordance with the Gaussian profile and a portion that is substantially constant as shown in FIG. 3B. That is, the volume density of the plurality of scattering particles 12P of the light extraction film 12 on the axis DD may vary according to a trimmed Gaussian profile having a planarized (i.e., constant) tail portion (that is, a portion spaced apart from a center of the Gaussian profile).

According to example embodiments, the haze of the light guide plate 10 may depend on the volume density of the scattering particles 12P of the light extraction film 12. According to example embodiments, the haze of the light guide plate 10 may be linearly proportional to the volume density of the scattering particles 12P of the light extraction film 12. Accordingly, the haze of the light guide plate 10 on the XX axis may vary along the Gaussian profile, and the haze of the light guide plate 10 on the DD axis may vary along the trimmed Gaussian profile.

According to example embodiments, the volume density of the plurality of scattering particles 12P of the light extraction film 12 on the axis XX may continuously vary. According to example embodiments, the volume density of the plurality of scattering particles 12P of the light extraction film 12 on the axis DD may discontinuously vary. According to example embodiments, the volume density of the plurality of scattering particles 12P of the light extraction film 12 on the axis DD may discontinuously vary at a boundary between the first areas 10I and the third area 10III.

According to example embodiments, the haze of the light guide plate 10 on the axis XX may continuously vary. According to example embodiments, the haze of the light guide plate 10 on the axis DD may discontinuously vary. According to example embodiments, the haze of the light guide plate 10 on the axis DD may discontinuously vary at a boundary between the first areas 10I and the third area 10III.

According to example embodiments, the volume density of the scattering particles 12P according to the position on the light extraction film 12 may be determined by counting the number of the scattering particles 12P in the light extraction film 12 using an optical microscope and measuring the diameter (e.g., the average diameter) of the scattering particles 12P using a scanning electron microscope (SEM). According to example embodiments, the size (e.g., average volume) of the scattering particles 12P may be calculated from the diameter (e.g., average diameter) of the scattering particles 12P. The sum of the volume of the scattering particles 12P according to the position on the light extraction film 12 may be calculated by multiplying the size (e.g., average volume) of the scattering particles 12P by the number of scattering particles 12P. The volume density of the scattering particles 12P of the light extraction film 12 according to the position on the light extraction film 12 may be determined by dividing the sum of the volumes of the scattering particles 12P by the volume of a corresponding portion of the light extraction film 12. In another example, the volume density of the scattering particles 12P of the light extraction film 12 may be calculated by measuring the haze of the light guide plate 10 according to the position on the light guide plate 10 and measuring the volume density of scattering particles 12P of the light extraction film 12 of a measuring point on the light guide plate 10 and extrapolating the volume density of the scattering particles 12P of the light extraction film 12 with respect to the entire light guide plate 10 based on the haze of the light guide plate 10 and the volume density of scattering particles 12P of the light extraction film 12 of the measuring point on the light guide plate 10.

According to example embodiments, the volume density of the plurality of scattering particles of the light extraction film 12 at the center 10C of the light guide plate 10 may range from about 0.1 vol % to about 0.5 vol %. According to example embodiments, the volume density of the plurality of scattering particles 12P of the light extraction film 12 at the center 10C of the light guide plate 10 may be about 0.05 vol % or more. According to example embodiments, the volume density of the plurality of scattering particles 12P of the light extraction film 12 at the center 10C of the light guide plate 10 may be about 0.1 vol % or more. According to example embodiments, the volume density of the plurality of scattering particles 12P of the light extraction film 12 at the center 10C of the light guide plate 10 may be about 0.15 vol % or more. According to example embodiments, the volume density of the plurality of scattering particles 12P of the light extraction film 12 at the center 10C of the light guide plate 10 may be about 0.45 vol % or less. According to example embodiments, the volume density of the plurality of scattering particles 12P of the light extraction film 12 at the center 10C of the light guide plate 10 may be about 0.4 vol % or less. According to example embodiments, the volume density of the plurality of scattering particles 12P of the light extraction film 12 at the center 10C of the light guide plate 10 may be about 0.35 vol % or less. According to example embodiments, the volume density of the plurality of scattering particles 12P of the light extraction film 12 at the center 10C of the light guide plate 10 may be about 0.3 vol % or less. According to example embodiments, the volume density of the plurality of scattering particles 12P of the light extraction film 12 at the center 10C of the light guide plate 10 may be about 0.25 vol % or less. According to example embodiments, the volume density of the plurality of scattering particles 12P of the light extraction film 12 at the center 10C of the light guide plate 10 may be about 0.2 vol % or less.

According to example embodiments, the haze of the light guide plate 10 at the center 10C of the light guide plate 10 may range from about 1.1% to about 2.0%. According to example embodiments, the haze of the light guide plate 10 at the center 10C of the light guide plate 10 may be about 1.2% or more. According to example embodiments, the haze of the light guide plate 10 at the center 10C of the light guide plate 10 may be about 1.3% or more. According to example embodiments, the haze of the light guide plate 10 at the center 10C of the light guide plate 10 may be about 1.4% or more. According to example embodiments, the haze of the light guide plate 10 at the center 10C of the light guide plate 10 may be about 1.5% or more. According to example embodiments, the haze of the light guide plate 10 at the center 10C of the light guide plate 10 may be about 1.6%. According to example embodiments, the haze of the light guide plate 10 at the center 10C of the light guide plate 10 may be about 1.9% or less. According to example embodiments, the haze of the light guide plate 10 at the center 10C of the light guide plate 10 may be about 1.8% or less. According to example embodiments, the haze of the light guide plate 10 at the center 10C of the light guide plate 10 may be about 1.7% or less.

The plurality of scattering particles 12P extract light, which is totally reflected inside the light guide plate 10, and the light extraction efficiency of the light guide plate 10 may be proportional to the number of scattering particles 12P. According to an experimental example, when the volume density of the plurality of scattering particles 12P of the light extraction film 12 at the center 10C of the light guide plate 10 is about 0.1 vol % or less, it was confirmed that the light extraction characteristics of the light guide plate 10 were too low, so that the illumination characteristics and energy efficiency of the illumination device 1 deteriorated.

When the volume density of the plurality of scattering particles 12P of the light extraction film 12 at the center 10C of the light guide plate 10 is too large, a degree of scattering of external light when the illumination device 1 is turned off may be too high. According to an experimental example, when the volume density at the center 10C of the light guide plate 10 is about 0.2 vol % or more, the volume density of the plurality of scattering particles 12P of the light extraction film 12 may cause a haze of the light guide plate 10 to be too large, which may impair the aesthetics of the illumination device 1.

According to example embodiments, a minimum value of the volume density of the plurality of scattering particles 12P of the light extraction film 12 in the second areas 10II of the light guide plate 10 may range from about 0.05 vol % to about 0.15 vol %. According to example embodiments, a minimum value of the volume density of the plurality of scattering particles 12P of the light extraction film 12 in the second areas 10II of the light guide plate 10 may be about 0.6 vol % or more. According to example embodiments, a minimum value of the volume density of the plurality of scattering particles 12P of the light extraction film 12 in the second areas 10II of the light guide plate 10 may be about 0.07 vol % or more. According to example embodiments, a minimum value of the volume density of the plurality of scattering particles 12P of the light extraction film 12 in the second areas 10II of the light guide plate 10 may be about 0.08 vol % or more. According to example embodiments, a minimum value of the volume density of the plurality of scattering particles 12P of the light extraction film 12 in the second areas 10II of the light guide plate 10 may be about 0.09 vol % or more. According to example embodiments, a minimum value of the volume density of the plurality of scattering particles 12P of the light extraction film 12 in the second areas 10II of the light guide plate 10 may be about 0.10 vol % or more. According to example embodiments, a minimum value of the volume density of the plurality of scattering particles 12P of the light extraction film 12 in the second areas 10II of the light guide plate 10 may be about 0.11 vol % or more. According to example embodiments, a minimum value of the volume density of the plurality of scattering particles 12P of the light extraction film 12 in the second areas 10II of the light guide plate 10 may be about 0.12 vol %. According to example embodiments, a minimum value of the volume density of the plurality of scattering particles 12P of the light extraction film 12 in the second areas 10II of the light guide plate 10 may be about 0.14 vol % or less. According to example embodiments, a minimum value of the volume density of the plurality of scattering particles 12P of the light extraction film 12 in the second areas 10II of the light guide plate 10 may be about 0.13 vol % or less.

According to example embodiments, the haze in the second areas 10II of the light guide plate 10 may range of from about 1.0% to about 1.5%. In example embodiments, the haze in the second areas 10II of the light guide plate 10 may be about 1.1% or more. In example embodiments, the haze in the second areas 10II of the light guide plate 10 may be about 1.2% or more. In example embodiments, the haze in the second areas 10II of the light guide plate 10 may be about 1.4% or less. In example embodiments, the haze in the second areas 10II of the light guide plate 10 may be about 1.3% or less.

According to example embodiments, the volume density of the plurality of scattering particles 12P of the light extraction film 12 in the first areas 10I of the light guide plate 10 may range from about 0.05 vol % to about 0.12 vol %. According to example embodiments, the volume density of the plurality of scattering particles 12P of the light extraction film 12 in the first areas 10I of the light guide plate 10 may be about 0.06 vol % or more. According to example embodiments, the volume density of the plurality of scattering particles 12P of the light extraction film 12 in the first areas 10I of the light guide plate 10 may be about 0.07 vol % or more. According to example embodiments, the volume density of the plurality of scattering particles 12P of the light extraction film 12 in the first areas 10I of the light guide plate 10 may be about 0.08 vol % or more. According to example embodiments, the volume density of the plurality of scattering particles 12P of the light extraction film 12 in the first areas 10I of the light guide plate 10 may be about 0.09 vol % or more. According to example embodiments, the volume density of the plurality of scattering particles 12P of the light extraction film 12 in the first areas 10I of the light guide plate 10 may be about 0.10 vol %. According to example embodiments, the volume density of the plurality of scattering particles 12P of the light extraction film 12 in the first areas 10I of the light guide plate 10 may be about 0.11 vol % or less.

According to example embodiments, a minimum value of the volume density of the plurality of scattering particles 12P of the light extraction film 12 in the second areas 10II of the light guide plate 10 may be greater than the volume density of the plurality of scattering particles 12P of the light extraction film 12 in the first areas 10I of the light guide plate 10. According to example embodiments, a difference between a minimum value of the volume density of the plurality of scattering particles 12P of the light extraction film 12 in the second areas 10II of the light guide plate 10 and the volume density of the plurality of scattering particles 12P of the light extraction film 12 in the first areas 10I of the light guide plate 10 may range from about 0.01 vol % p to about 0.05 vol % p. According to example embodiments, a difference between a minimum value of the volume density of the plurality of scattering particles 12P of the light extraction film 12 in the second areas 10II of the light guide plate 10 and the volume density of the plurality of scattering particles 12P of the light extraction film 12 in the first areas 10I of the light guide plate 10 may be about 0.02 vol % p or more. According to example embodiments, a difference between a minimum value of the volume density of the plurality of scattering particles 12P of the light extraction film 12 in the second areas 10II of the light guide plate 10 and that of the volume density of the plurality of scattering particles 12P of the light extraction film 12 in the first areas 10I of the light guide plate 10 may be about 0.04 vol % p or less.

According to example embodiments, the minimum value of the haze of the light guide plate 10 in the second areas 10II of the light guide plate 10 may be greater than the haze of the light guide plate 10 in the first areas 10I of the light guide. According to example embodiments, the difference between the minimum value of the haze of the light guide plate 10 in the second regions 10II of the light guide plate 10 and the haze of the light guide plate 10 in the first regions 10I of the light guide plate 10 may range from about 0.01% p to about 0.05% p. According to example embodiments, the difference between the minimum value of the haze of the light guide plate 10 in the second regions 10II of the light guide plate 10 and the haze of the light guide plate 10 in the first regions 10I of the light guide plate 10 may be about 0.04% p or less. According to example embodiments, the difference between the minimum value of the haze of the light guide plate 10 in the second regions 10II of the light guide plate 10 and the haze of the light guide plate 10 in the first regions 10I of the light guide plate 10 may be about 0.03% p or less. According to example embodiments, the difference between the minimum value of the haze of the light guide plate 10 in the second regions 10II of the light guide plate 10 and the haze of the light guide plate 10 in the first regions 10I of the light guide plate 10 may be about 0.02% p or less.

Figure 3C:
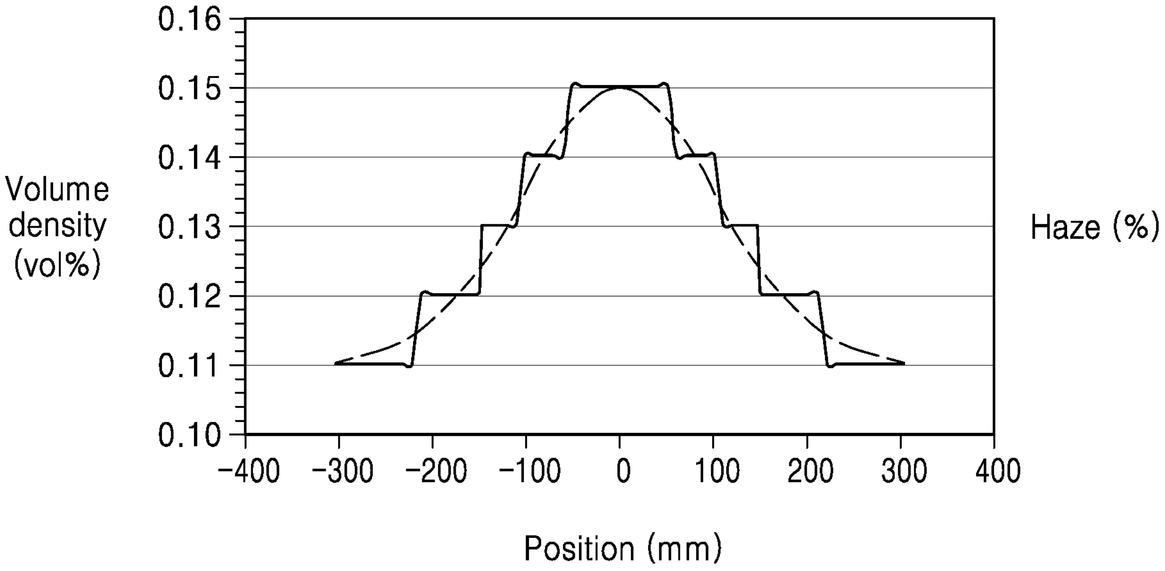
FIG. 3C shows the density of the plurality of scattering particles of the light extraction film according to a distance from the center of the light guide plate on the axis XX of FIG. 1A.

FIG. 3C shows another example of the density of the plurality of scattering particles 12P of the light extraction film 12 according to a distance R from the center 10C of the light guide plate 10 on the axis XX of FIG. 1A. Specifically, in FIG. 3C, the solid line shows another example of the density of the plurality of scattering particles 12P of the light extraction film 12 according to a distance R from the center 10C of the light guide plate 10 on the axis XX, and the dashed line shows the graph of FIG. 3A for comparison.

Figure 3D:
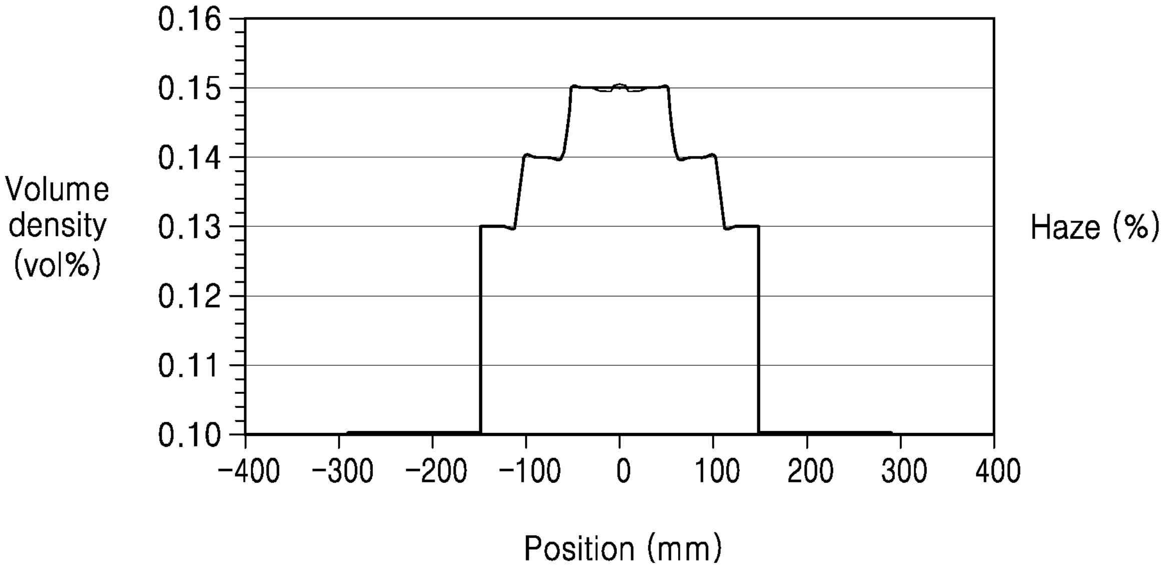
FIG. 3D shows the density of scattering particles of a light extraction film according a distance from to a center of the light guide plate on an axis DD of FIG. 1A.

FIG. 3D shows another example of the density of the plurality of scattering particles 12P of the light extraction film 12 according to the distance R from the center 10C of the light guide plate 10 on the axis DD of FIG. 1A.

Since the volume density of the scattering particles 12P of the light extraction film 12 in the first regions 10I is substantially the same as that described with reference to FIGS. 3A and 3B, a redundant description thereof will be omitted.

Referring to FIGS. 1A, 1B, 3C and 3D, the volume densities of the plurality of scattering particles 12P of the light extraction film 12 in the second areas 10II and the third area 10III may vary with the distance R from the center 10C of the light guide plate 10 to a position P on the light guide plate 10.

According to example embodiments, the volume density of the scattering particles 12P of the light extraction film 12 may be maximum at the center 10C of the light guide plate 10. According to example embodiments, the volume densities of the plurality of scattering particles 12P of the light extraction film 12 in the second areas 10II and the third area 10III may have a quantized Gaussian profile with the distance R from the center 10C being variable.

The volume density of the scattering particles 12P of the light extraction film 12 of the second regions 10II and the third region 10III following a quantized Gaussian profile may be calculated according to Equation 3 below.

$$\text{Volume density} = \begin{cases} Vd0, \text{ if } 0 \le R \le R0 \\ Vd1, \text{ if } R0 < R \le R1 \\ Vd2, \text{ if } R1 < R \le R2 \\ Vd3, \text{ if } R2 < R \le R3 \\ Vd4, \text{ if } R3 < R \end{cases} \qquad \text{[Equation 3]}$$

Here, R is a distance from the center 10C of the light guide plate 10.

According to example embodiments, Vd0 may be greater than Vd1, Vd1 may be greater than Vd2, Vd2 may be greater than Vd3, and Vd3 may be greater than Vd4. In the example of FIG. 3C, Vd0 may range from about 0.14 vol % to about 0.16 vol %, Vd1 may range from about 0.13 vol % to about 0.15 vol %, Vd2 may range from about 0.12 vol % to about 0.14 vol %, Vd3 may range from about 0.11 vol % to about 0.13 vol % and Vd4 may range from about 0.1 vol % to about 0.12 vol %. In the example of FIG. 3*c*, Vd0 may be about 0.15 vol %, Vd1 may be about 0.14 vol %, Vd2 may be about 0.13 vol %, Vd3 may be about 0.12 vol %, and Vd4 may be about 0.11 vol %.

In the example of FIG. 3C, R0 may be greater than R1, R1 may be greater than R2, and R3 may be greater than R2. According to example embodiments, R0 may be greater than 0 and less than or equal to about 100 mm, R1 may range from about 50 mm to about 150 mm, R2 may range from about 100 mm to about 200 mm, and R3 may range from about 150 mm to about 250 mm. In the example of FIG. 3C, R0 may be about 50 mm, R1 may be about 100 mm, R2 may be about 150 mm, and R3 may be about 200 mm.

Figure 4:
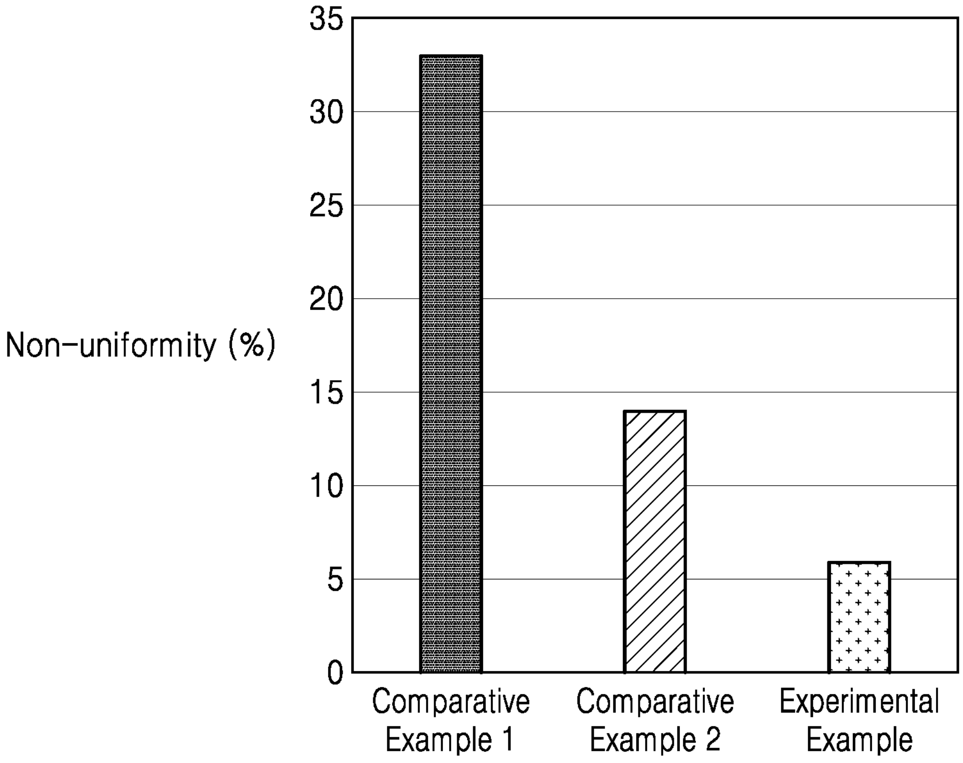
FIG. 4 is a graph for explaining an effect of an illumination device according to example embodiments.

FIG. 4 is a graph for explaining an effect of an illumination device according to example embodiments, and more particularly, FIG. 4 shows the non-uniformity of luminance of each of illumination devices of Comparative Example 1, Comparative Example 2, and Experimental Example.

In FIG. 4, in an illumination device of Comparative Example 1, a volume density of a plurality of scattering particles is constant over an entire surface of a light guide plate, and in an illumination device of Comparative Example 2, a volume density of a plurality of scattering particles follows a Gaussian profile that depends on a distance from a center of a light guide plate over an entire surface of the light guide plate. In an illumination device of Experimental Example of FIG. 4, a volume density of a plurality of scattering particles is the same as that described with reference to FIGS. 1A, 1B, and 3.

Referring to FIGS. 1A, 1B, and 4, it was confirmed that the non-uniformity of luminance of the illumination device in Comparative Example 1 was very high, which was about 30% or more. In Comparative Example 2, the non-uniformity of luminance of the illumination device was about 14%, which was greatly improved compared to that of Comparative Example 1, but as the non-uniformity of luminance exceeded 10%, it may be easily recognized by the user's naked eye.

The non-uniformity of luminance of the illumination device of Experimental Example was about 6%, which was greatly improved compared to that of Comparative Example 1 and Comparative Example 2, and because it was 10% or less, it may not be recognized by the user's naked eye.

According to example embodiments, as the volume density of the plurality of scattering particles 12P of the light extraction film 12 follows a Gaussian profile in the second areas 10II and the third area 10III of the light guide plate 10, and the light guide plate 10 having a substantially constant value is provided in the first areas 10I, the uniformity of luminance of the illumination device 1 including the plurality of light sources 20 irradiating light to each of corners of the light guide plate 10 may be improved.

Figure 5:
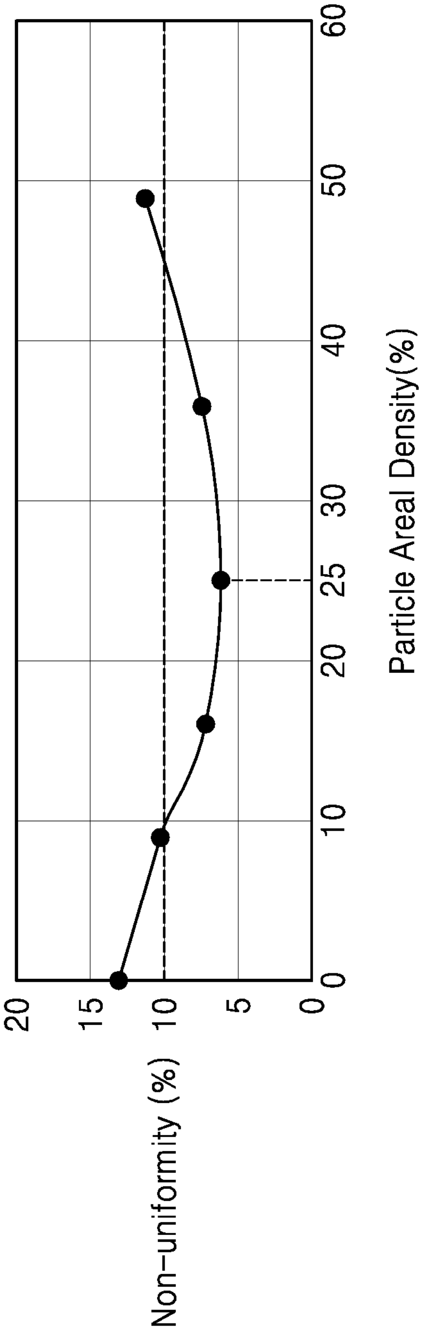
FIG. 5 shows a change in non-uniformity of luminance of an illumination device according to an area of first areas of FIG. 1A.

FIG. 5 shows a change in non-uniformity of luminance of the illumination device 1 according to an area of the first areas 10I of FIG. 1A.

Referring to FIG. 5, when a sum of areas of the first areas 10I ranges from about 10% to about 40% of an area of the light guide plate 10, it was confirmed that the non-uniformity of luminance of the illumination device 1 was 10% or less. According to example embodiments, as the light guide plate 10 in which a sum of areas of the first areas 10I ranges from about 10% to about 40% of an area of the light guide plate 10 is provided, the non-uniformity of luminance of the illumination device 1 may be kept low, and a higher level of user experience may be provided.

Figure 6A:
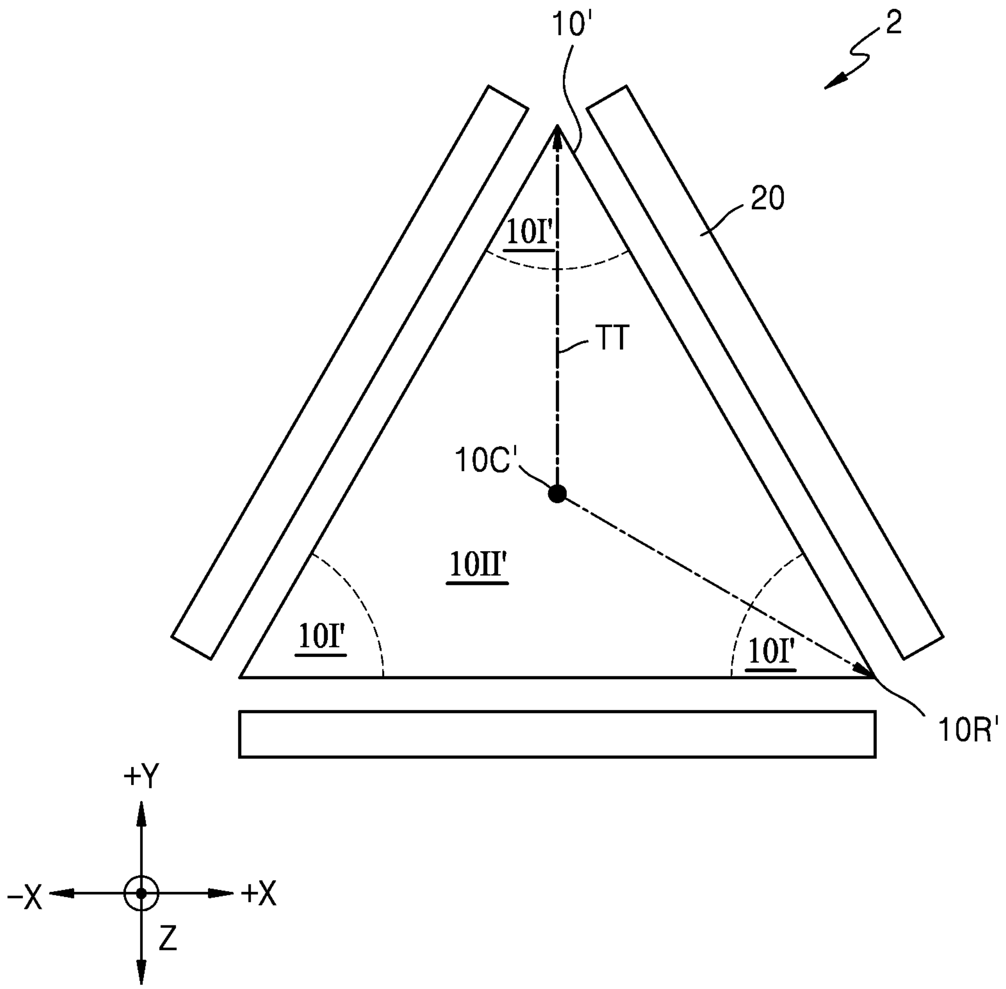
FIG. 6A is a plan view of an illumination device according to other example embodiments.

FIG. 6A is a plan view of an illumination device 2 according to other example embodiments.

Figure 6B:
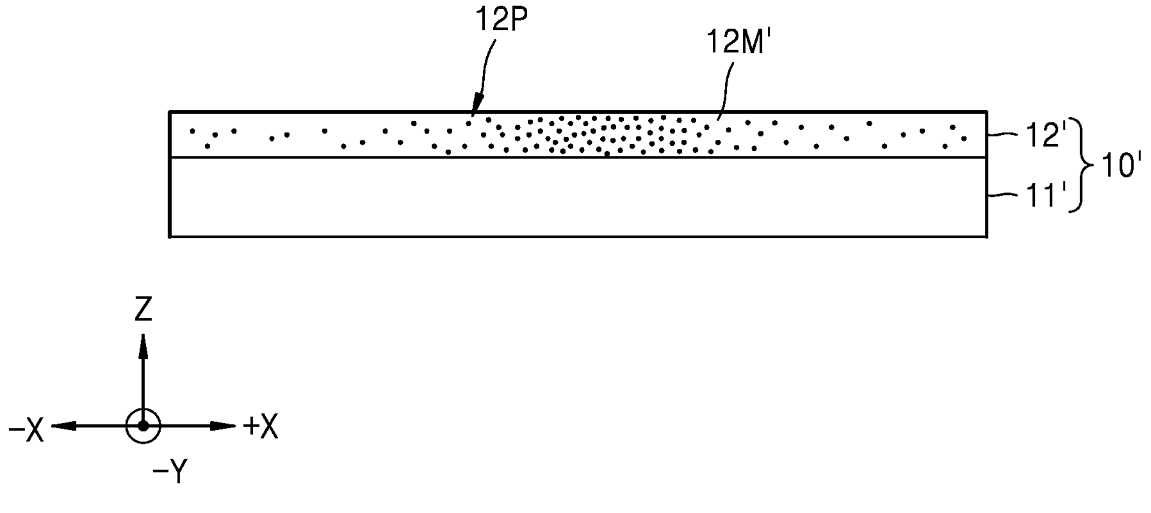
FIG. 6B is a cross-sectional view of a light guide plate taken along an axis TT of FIG. 6A.

FIG. 6B is a cross-sectional view of a light guide plate 10' taken along an axis TT of FIG. 6A.

Referring to FIGS. 6A and 6B, the illumination device 2 may include a light guide plate 10' and the plurality of light sources 20.

The light guide plate 10' of FIG. 6A may have a triangular planar shape, and accordingly, the illumination device 2 may include three light sources 20 corresponding to edges of the light guide plate 10'.

According to example embodiments, the light guide plate 10' may include a transparent substrate 11' and a light extraction film 12' on the transparent substrate 11'. The plurality of light sources 20 are substantially the same as the plurality of light sources 20 described with reference to FIGS. 1A and 1B, and the transparent substrate 11' is substantially the same as the transparent substrate 11 described with reference to FIGS. 1A and 1B except for a difference in shape, and thus, redundant descriptions thereof are omitted.

According to example embodiments, the light guide plate 10' may include first areas 10I' and a second area 10II'. According to example embodiments, the first areas 10I' may respectively include corners 10R' of the light guide plate 10'. According to example embodiments, the first areas 10I' may be a portion of a circle around the corners 10R' of the light guide plate 10', respectively.

According to example embodiments, the second area 10II' may be surrounded by the first areas 10I'. According to example embodiments, the second area 10II' may include a center 10C' of the light guide plate 10'.

According to example embodiments, a volume density of the plurality of scattering particles 12P of the light extraction film 12' may vary according to a position on the light guide plate 10'. According to example embodiments, the volume density of the plurality of scattering particles of the light extraction film 12' in the first areas 10I' may be substantially constant. According to example embodiments, a volume density of the plurality of scattering particles 12P of the light extraction film 12' in the second area 10II' may have a Gaussian profile with a distance from the center 10C' of the light guide plate 10' as a variable.

According to example embodiments, on the axis TT, the volume density of the plurality of scattering particles 12P of the light extraction film 12' according to the distance from the center 10C' of the light guide plate 10' may vary along a trimmed Gaussian profile. That is, on the axis TT, the volume density of the plurality of scattering particles 12P of the light extraction film 12' according to the distance from the center 10C' of the light guide plate 10' may vary to be substantially equal to a density of the plurality of scattering particles 12P (referring to FIG. 1B) of the light extraction film 12 (referring to FIG. 1B) according to a distance from the center 10C (referring to FIG. 1A) of the light guide plate 10 (referring to FIG. 1B) on the axis DD shown in FIG. 3B.

Figure 7A:
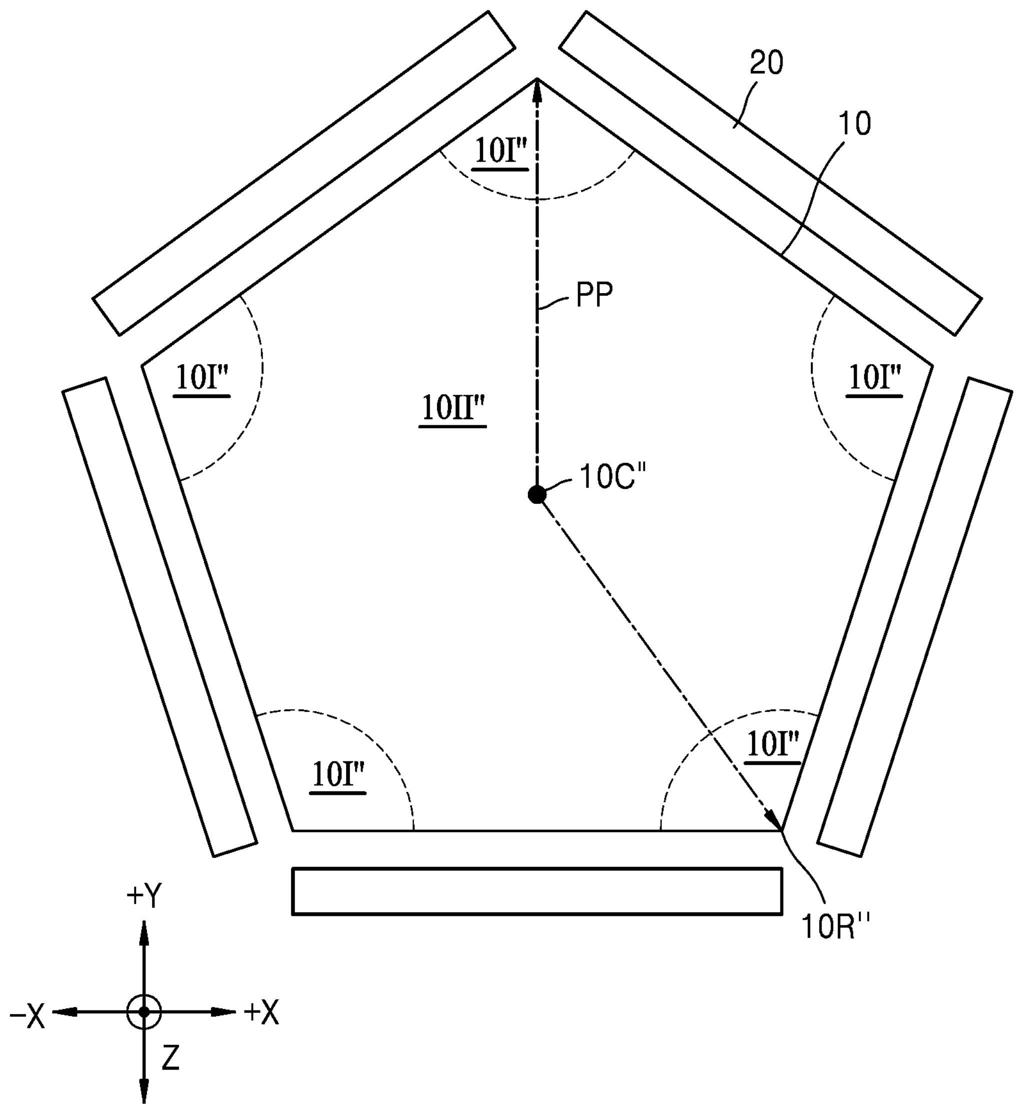
FIG. 7A is a plan view of an illumination device according to other example embodiments.

FIG. 7A is a plan view of an illumination device 3 according to other example embodiments.

Figure 7B:
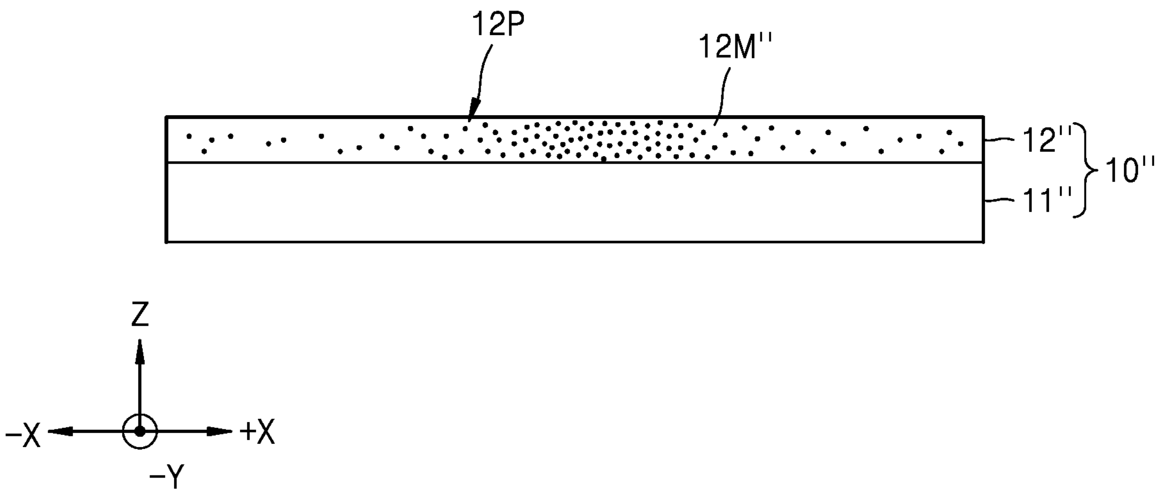
FIG. 7B is a cross-sectional view of a light guide plate taken along an axis PP of FIG. 7A.

FIG. 7B is a cross-sectional view of a light guide plate 10" taken along an axis PP of FIG. 7A.

A light guide plate 10" of FIG. 7A may have a pentagonal planar shape, and accordingly, the illumination device 3 may include five light sources 20 corresponding to edges of the light guide plate 10".

According to example embodiments, the light guide plate 10" may include a transparent substrate 11" and a light extraction film 12" on the transparent substrate 11". The plurality of light sources 20 are substantially the same as the plurality of light sources 20 described with reference to FIGS. 1A and 1B, and the transparent substrate 11" is substantially the same as the transparent substrate 11 described with reference to FIGS. 1A and 1B except for a difference in shape, and thus, redundant descriptions thereof are omitted.

According to example embodiments, the light guide plate 10" may include first areas 10I" and a second area 10II". According to example embodiments, the first areas 10I" may respectively include corners 10R" of the light guide plate 10". According to example embodiments, the first areas 10I" may be a portion of a circle around the corners 10R" of the light guide plate 10", respectively.

According to example embodiments, the second area 10II" may be surrounded by the first areas 10I". According to example embodiments, the second area 10II' may include a center 10C" of the light guide plate 10".

According to example embodiments, a volume density of the plurality of scattering particles 12P of the light extraction film 12" may vary according to a position on the light guide plate 10". According to example embodiments, the volume density of the plurality of scattering particles of the light extraction film 12" in the first areas 10I" may be substantially constant. According to example embodiments, a volume density of the plurality of scattering particles 12P of the light extraction film 12" in the second area 10II" may have a Gaussian profile with a distance from the center 10C" of the light guide plate 10" as a variable.

According to example embodiments, on the axis PP, the volume density of the plurality of scattering particles 12P of the light extraction film 12" according to the distance from the center 10C" of the light guide plate 10" may vary along a trimmed Gaussian profile. That is, on the axis PP, the volume density of the plurality of scattering particles 12P of the light extraction film 12" according to the distance from the center 10C" of the light guide plate 10" may vary to be substantially equal to a density of the plurality of scattering particles 12P (referring to FIG. 1B) of the light extraction film 12 (referring to FIG. 1B) according to a distance from the center 10C (referring to FIG. 1A) of the light guide plate 10 (referring to FIG. 1B) on the axis DD shown in FIG. 3B.

In the above, the illumination device 2 including the light guide plate 10' having a triangular planar shape, the illumination device 1 including the light guide plate 10 having a rectangular planar shape, and the illumination device 3 including the light guide plate 10" having a pentagonal planar shape have been described. One skilled in the art may easily reach the embodiments of a polygonal-shaped light guide plate having six or more corners, a light guide plate including a regular curved outline which is a curve of a regular shape (e.g., a portion of a parabola, a hyperbola, an ellipse, or the like), a light guide plate including a curved outline which is a curve of an irregular shape, and an illumination device including the same based on descriptions made herein.

Figure 8:
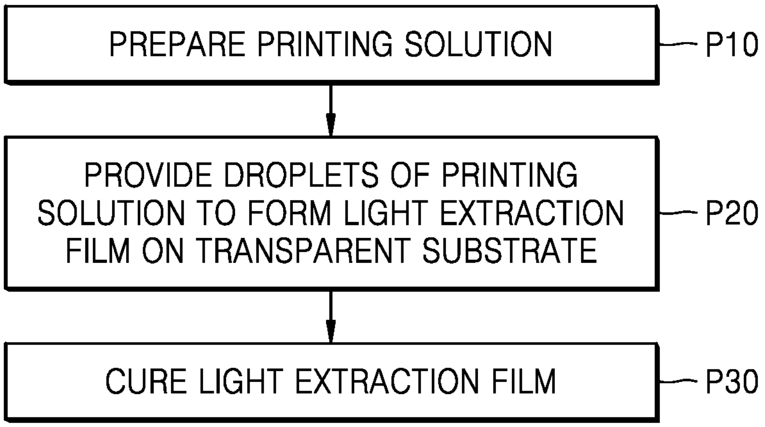
FIG. 8 is a flowchart illustrating a method of manufacturing a light guide plate according to example embodiments.

FIG. 8 is a flowchart illustrating a method of manufacturing a light guide plate according to example embodiments.

Referring to FIGS. 1A, 1B, and 8, in P10, a printing solution may be prepared. The printing solution may have a plurality of scattering particles. According to example embodiments, the printing solution may include a solvent, a resin material, and the plurality of scattering particles 12P. According to example embodiments, the plurality of scattering particles 12P may include at least one of $TiO_2$, $ZrO_2$, $BaTiO_3$, and $SnO_2$.

The printing solution may include, for example, a mixture of polysiloxane and dipropylene glycol methyl ether (DPM). The printing solution may include, for example, a mixture of hexamethylene diacrylate, exo-1,7,7-trimethylbicyclo [2.2.1]hept-2-yl acrylate, benzyl acrylate, 2-methoxyethyl acrylate, and diphenyl(2,4,6-trimethylbenzoyl) phosphine oxide. A content of the plurality of scattering particles 12P of the printing solution may range from about 0.1 wt % to about 5 wt %.

Then, in P20, droplets of the printing solution may be provided so that the light extraction film 12 is formed on the transparent substrate 11. According to example embodiments, the light extraction film 12 may be formed by methods such as slot-die coating and inkjet printing.

The light extraction film 12 may be formed, for example, by providing droplets of the printing solution on the transparent substrate 11. A diameter of the droplets of the printing solution may range from about 20 μm to about 200 μm.

According to example embodiments, the light extraction film 12 having the volume density distribution of the plurality of scattering particles 12P described with reference to FIGS. 1A to 3B may be provided by adjusting the number of droplets of the printing solution provided per unit area.

In particular, a larger number of droplets of the printing solution per unit area may be provided to a portion of the transparent substrate 11 closer to the center 10C of the light guide plate 10, and a decreasing number of droplets of the printing solution per unit area may be provided to a portion of the transparent substrate 11 as a distance from the center 10C of the light guide plate 10 increases. The smallest number of droplets of the printing solution per unit area may be provided to the first area 10I of the light guide plate 10. The number of droplets provided varies according to a position on the transparent substrate 11, but a large portion of a volume of the droplets is evaporated due to evaporation of the solvent included in the droplets, so the light extraction film 12 may be substantially planar. For example, a difference between a thickness of the light extraction film 12 at the center 10C of the light guide plate 10 and a thickness of the light extraction film 12 at the corner 10R may be about 1 μm or less.

According to other example embodiments, the light extraction film 12 having the volume density distribution of the plurality of scattering particles 12P described with reference to FIGS. 1A to 3B may be provided by adjusting the content of the plurality of scattering particles 12P included in the printing solution.

In particular, the droplets of the printing solution having a high content of the plurality of scattering particles 12P may be provided to a portion of the transparent substrate 11 closer to the center 10C of the light guide plate 10, and the droplets of the printing solution having a decreasing content of the plurality of scattering particles 12P may be provided to a portion of the transparent substrate 11 as a distance from the center 10C of the light guide plate 10 increases. The droplets of the printing solution having the lowest content of the plurality of scattering particles 12P may be provided to the first area 10I of the light guide plate 10.

The content of the plurality of scattering particles 12P included in the droplets of the printing solution may be adjusted by preparing two or more printing solutions having different contents of scattering particles, and providing droplets of a mixture of the two or more printing solutions on the transparent substrate 11 by using an inkjet header capable of simultaneously using the two or more solutions. The content of the plurality of scattering particles 12P included in the droplets of the printing solution may be adjusted by adjusting a mixing ratio of the two or more solutions.

Next, in P30, the light extraction film 12 may be cured. Curing of the light extraction film 12 may include ultra violet (UV) curing using an inline UV curing machine or thermal curing. The light guide plate 10 described with reference to FIGS. 1A and 1B may be provided as the curing of the light extraction film 12 is completed. In addition, as the plurality of light sources 20 are provided at the edges of the light guide plate 10, the illumination device 1 according to example embodiments may be provided.

In the above, embodiments of the method of manufacturing the light guide plate 10 described with reference to FIGS. 1A and 1B have been described. In addition, one skilled in the art may easily reach the manufacturing of the light guide plate 10' described with reference to FIGS. 6A and 6B and the light guide plate 10" described with reference to FIGS. 7A and 7B based on the descriptions made herein.

According to the present disclosure, an illumination device with improved uniformity of luminance may be provided.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An illumination device comprising:

a light guide plate comprising a transparent substrate and a light extraction film on the transparent substrate, the light guide plate comprising one or more edges; and one or more light sources configured to irradiate light to the one or more edges of the light guide plate, wherein the light extraction film comprises:

a matrix layer; and a plurality of scattering particles embedded in the matrix layer, wherein the light guide plate comprises first areas in which a volume density of the plurality of scattering particles of the light extraction film is substantially constant, and second areas in which the volume density of the plurality of scattering particles of the light extraction film varies along a Gaussian profile.

2. The illumination device of claim 1, wherein the first areas are adjacent to corners of the light guide plate.

3. The illumination device of claim 1, wherein each of the first areas include corresponding one of corners of the light guide plate.

4. The illumination device of claim 1, wherein a sum of areas of the first areas ranges from 10% to 40% of an area of the light guide plate.

5. The illumination device of claim 1, wherein a sum of areas of the first areas ranges from 15% to 35% of an area of the light guide plate.

6. The illumination device of claim 1, wherein a sum of areas of the first areas ranges from 20% to 30% of an area of the light guide plate.

7. The illumination device of claim 1, wherein a sum of areas of the first areas is 25% of an area of the light guide plate.

8. The illumination device of any of claim 1, wherein a planar shape of the light guide plate is a square shape, and a planar shape of each of the first areas is a square shape.

9. The illumination device of claim 1, wherein a planar shape of the light guide plate is a square shape, and each of the first areas is a portion of a circle around a corresponding one of corners of the light guide plate.

10. The illumination device of claim 1, wherein each of the second areas is between two neighboring first areas among the first areas.

11. The illumination device of claim 1, wherein the light guide plate further comprises a third area surrounded by the first areas and the second areas, and the volume density of the plurality of scattering particles of the light extraction film in the third area varies along a Gaussian profile.

12. The illumination device of claim 11, wherein the volume density of the plurality of scattering particles of the light extraction film in the second areas and the third area varies along a Gaussian profile with a distance from a center of the light guide plate as a variable.

13. The illumination device of claim 11, wherein an average of the volume density of the plurality of scattering particles of the light extraction film in each of the first areas is less than an average of the volume density of the plurality of scattering particles of the light extraction film in each of the second areas.

14. The illumination device of claim 11, wherein an average of the volume density of the plurality of scattering particles of the light extraction film in each of the first areas is less than an average of the volume density of the plurality of scattering particles of the light extraction film in the third area.

15. The illumination device of claim 11, wherein an average of the volume density of the plurality of scattering particles of the light extraction film in each of the second areas is less than an average of the volume density of the plurality of scattering particles of the light extraction film in the third area.

16. The illumination device of claim 11, wherein twice an average of the volume density of the plurality of scattering particles of the light extraction film in each of the first areas is greater than an average of the volume density of the plurality of scattering particles of the light extraction film in the third area.

17. The illumination device of claim 11, wherein twice an average of the volume density of the plurality of scattering particles of the light extraction film in each of the second areas is greater than an average of the volume density of the plurality of scattering particles of the light extraction film in the third area.

18. The illumination device of claim 11, wherein the volume density of the plurality of scattering particles of the light extraction film in each of the first areas is less than a minimum value of the volume density of the plurality of scattering particles of the light extraction film in each of the second areas.

19. The illumination device of claim 11, wherein the volume density of the plurality of scattering particles of the light extraction film in each of the first areas is less than a minimum value of the volume density of the plurality of scattering particles of the light extraction film in the third area.

20. The illumination device of claim 11, wherein a difference between the volume density of the plurality of scattering particles of the light extraction film in each of the first areas and a minimum value of the volume density of the plurality of scattering particles of the light extraction film in each of the second areas ranges from 0.01 vol % p to 0.2 vol % p.

21. A light guide plate comprising:

a transparent substrate having a rectangular planar shape; and a light extraction film on the transparent substrate, wherein the light extraction film comprises:

a matrix layer; and a plurality of scattering particles embedded in the matrix layer, a volume density of the plurality of scattering particles of the light extraction film on a first axis varies along a Gaussian profile, wherein the first axis passes through a center of the light guide plate and is parallel to any one of edges of the light guide plate, and the volume density of the plurality of scattering particles of the light extraction film on a second axis varies along a trimmed Gaussian profile having a planarized tail portion, wherein the second axis passes through the center of the light guide plate and connects two corners of the light guide plate diagonally positioned to each other.

22. The light guide plate of claim 21, wherein the volume density of the plurality of scattering particles of the light extraction film on a third axis varies along a Gaussian profile, wherein the third axis passes through the center of the light guide plate and is perpendicular to the first axis.

23. The light guide plate of claim 21, wherein a minimum value of the volume density of the plurality of scattering particles of the light extraction film on the first axis is greater than the volume density of the plurality of scattering particles of the light extraction film of the planarized tail portion on the second axis.

24. The light guide plate of claim 21, wherein the volume density of the plurality of scattering particles of the light extraction film is maximum at the center of the light guide plate.

25. The light guide plate of claim 21, wherein the volume density of the plurality of scattering particles of the light extraction film in the second areas and the third area is a Gaussian profile with a distance from the center of the light guide plate as a variable.

26. The light guide plate of claim 21, wherein an average size of each of the plurality of scattering particles ranges from 100 nm to 500 nm.

27. The light guide plate of claim 21, wherein a haze of the light guide plate ranges from 0.1% to 5%.

28. The light guide plate of claim 21, wherein a length of each of four edges of the light guide plate ranges from 100 mm to 2,000 mm.

29. The light guide plate of claim 21, wherein a refractive index of the matrix layer is greater than a refractive index of the transparent substrate.

30. The light guide plate of claim 21, wherein each of the plurality of scattering particles comprises any one of $TiO_2$, $ZrO_2$, $BaTiO_3$, and $SnO_2$.

31. An illumination device comprising:

a light guide plate comprising a transparent substrate having a polygonal planar shape and a light extraction film on the transparent substrate; and a plurality of light sources configured to irradiate light to each of edges of the light guide plate, wherein the light extraction film comprises:

a matrix layer; and a plurality of scattering particles embedded in the matrix layer, the light guide plate comprises first areas including corners of the polygon and second areas between adjacent first areas, a volume density of the plurality of scattering particles of the light extraction film in the first areas is substantially constant, the volume density of the plurality of scattering particles of the light extraction film in the second areas continuously varies, and the volume density of the plurality of scattering particles of the light extraction film discontinuously varies at a boundary between the first and second areas.

32. The illumination device of claim 31, wherein the volume density of the plurality of scattering particles of the light extraction film in each of the first areas is less than a minimum value of the volume density of the plurality of scattering particles of the light extraction film in each of the second areas.

33. The illumination device of claim 31, wherein a difference between the volume density of the plurality of scattering particles of the light extraction film in each of the first areas and a minimum value of the volume density of the plurality of scattering particles of the light extraction film in each of the second areas ranges from 0.01 vol % p to 0.2 vol % p.

34. The illumination device of claim 31, wherein a difference between the volume density of the plurality of scattering particles of the light extraction film in each of the first areas and a minimum value of the volume density of the plurality of scattering particles of the light extraction film in each of the second areas is 0.05 vol % p or more.

35. The illumination device of claim 31, wherein a difference between the volume density of the plurality of scattering particles of the light extraction film in each of the first areas and a minimum value of the volume density of the plurality of scattering particles of the light extraction film in each of the second areas is 0.15 vol % p or less.

36. The illumination device of claim 31, wherein the light guide plate further comprises a third area surrounded by the first areas and the second areas, and the volume density of the plurality of scattering particles of the light extraction film in the second areas and the third area varies along a Gaussian profile with a distance from a center of the light guide plate as a variable.

37. A method of manufacturing a light guide plate, the method comprising:

preparing a printing solution comprising a resin and a plurality of scattering particles;

providing droplets of the printing solution to form a light extraction film on a transparent substrate; and curing the light extraction film, wherein the light extraction film comprises a first portion in which a volume density of the plurality of scattering particles is substantially constant, and a second portion in which the volume density of the plurality of scattering particles varies along a Gaussian profile.

38. The method of claim 37, wherein the providing of the droplets comprises adjusting a volume density of the plurality of scattering particles of the light extraction film of the first portion and the second portion by adjusting a number of droplets provided per unit area.

39. The method of claim 37, wherein the providing of the droplets comprises adjusting a volume density of the plurality of scattering particles of the light extraction film of the first portion and the second portion by adjusting a content of the plurality of scattering particles comprised in the droplets.

40. An illumination device comprising:

a light guide plate comprising a transparent substrate, and a light extraction film on the transparent substrate, the light guide plate comprising one or more edges; and one or more light sources configured to irradiate light to the one or more edges of the light guide plate, wherein the light extraction film comprises:

a matrix layer; and a plurality of scattering particles embedded in the matrix layer, wherein the light guide plate further comprises first areas in which a volume density of the plurality of scattering particles of the light extraction film is substantially constant, and second areas in which the volume density of the plurality of scattering particles of the light extraction film varies along a quantized Gaussian profile.

41. The illumination device of claim 40, wherein the volume density of the plurality of scattering particles of the light extraction film the second regions varies according to the following formula $$\text{Volume density} = \begin{cases} Vd0, \text{ if } 0 \leq R \leq R0 \\ Vd1, \text{ if } R0 < R \leq R1 \\ Vd2, \text{ if } R1 < R \leq R2 \\ Vd3, \text{ if } R2 < R \leq R3 \\ Vd4, \text{ if } R3 < R \end{cases}$$

wherein Vd0 is greater than Vd1, Vd1 is greater than Vd2, Vd2 is greater than Vd3, and Vd3 is greater than Vd4, and wherein R0 is greater than 0, R1 is greater than R2, and R2 is greater than R3.

* * * * *